United States Patent [19]
Scott

[11] 3,910,638
[45] Oct. 7, 1975

[54] WHEEL STRUCTURE
[75] Inventor: Delmer D. Scott, Encino, Calif.
[73] Assignee: Western U.S. Industries, Fresno, Calif.
[22] Filed: May 9, 1974
[21] Appl. No.: 468,369

[52] U.S. Cl. .............................. 301/63 R; 301/67
[51] Int. Cl.² .......................................... B60B 3/12
[58] Field of Search.............. 301/63 R, 65, 67, 72; 29/159.1, 159 R, 159.01

[56] References Cited
UNITED STATES PATENTS
2,019,109   10/1935   Ash.................................... 301/65
3,582,141   6/1971   Kelsey................................ 301/65
3,635,529   1/1972   Nass.................................. 301/65

Primary Examiner—M. Henson Wood, Jr.
Assistant Examiner—D. W. Keen
Attorney, Agent, or Firm—Georges A. Maxwell

[57] ABSTRACT

A fabricated automobile wheel structure comprising an outer annular tire engaging malleable steel rim section and a central circular cast, non-ferrous metal center section, said rim section having a flat, cylindrical portion with a radially inwardly disposed inside surface, said center section having a straight, cylindrical radially outwardly disposed outside surface opposing the inside surface on a plurality of axially spaced, radially outwardly projecting annular ribs establishing tight interferring fit with said inside surface, circumferentially spaced radially outwardly opening sockets entering said outside surface, radially inwardly projecting dimples in the said cylindrical portion and establishing contacting engagement in and with the sockets and a mass of supporting cement between spaced opposing surfaces of the rim and center sections.

10 Claims, 10 Drawing Figures

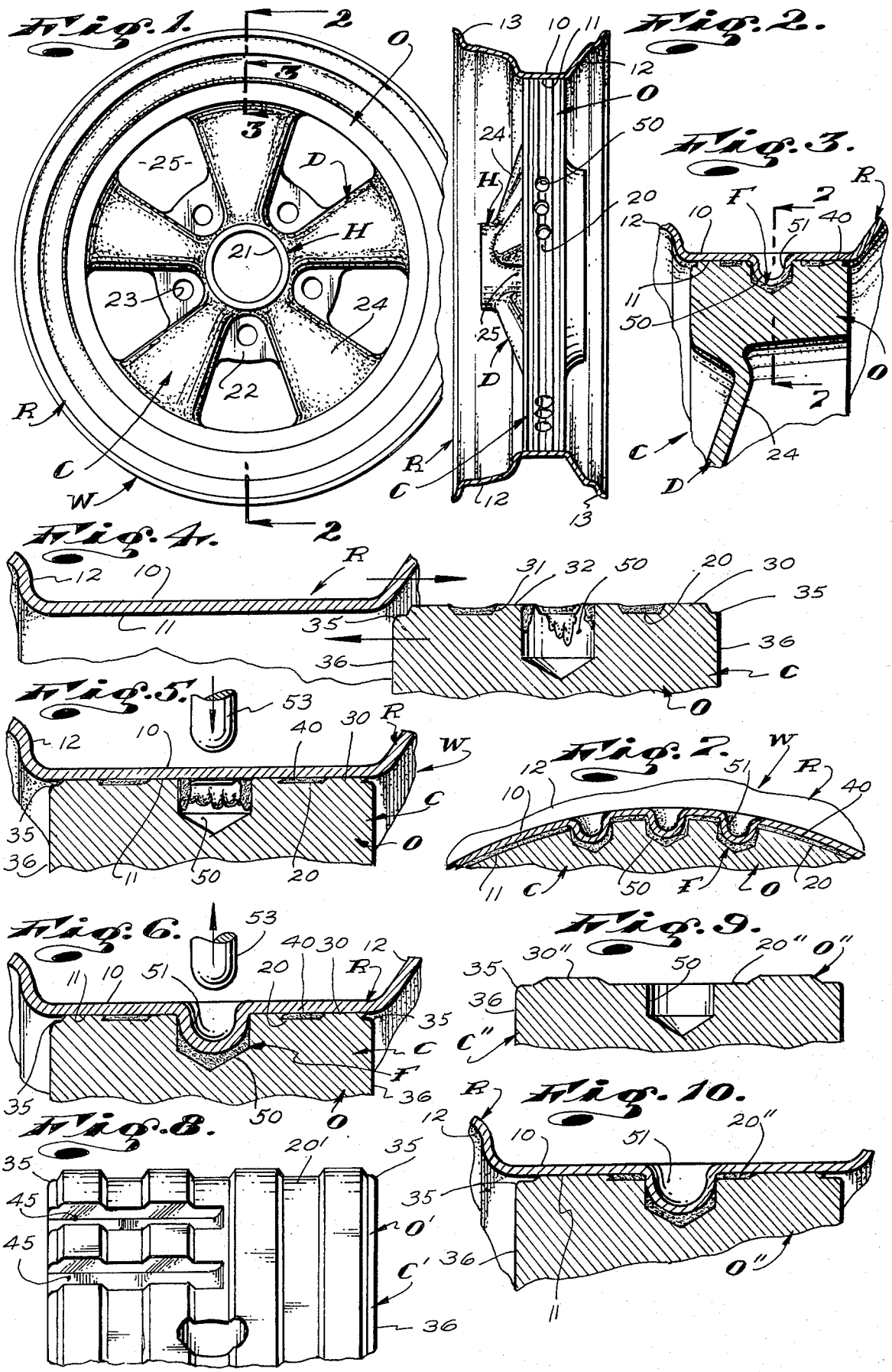

WHEEL STRUCTURE

This invention has to do with an improved automobile wheel construction and is more particularly concerned with improved and novel means for fixing a circular, cast metal, wheel center in an annular formed steel, wheel rim.

In recent years it has been common practice to establish automobile wheels with annular, formed steel, tire engaging rims and circular disc-like, cast aluminum, decorative wheel centers. The centers are provided with appropriate openings and apertures to accommodate wheel mounting parts of a related automobile, such as wheel bearing cones, studs and the like, to facilitate mounting of the wheels. The centers are aesthetically embellished with various ornamental features.

The principal difficulty in establishing wheels of the character referred to above resides in the satisfactory and effective fixing of the aluminum centers in and with the steel rims.

Since the steel rims cannot be satisfactorily welded to the aluminum centers, the prior art has most often resorted to providing the centers with circumferentially spaced radially outwardly and thence axially extending steel mounting pads, portions of which occur adjacent the steel rim and are accessible when the center is engaged in the rim and which are welded to rim to fix the parts together. The pads have anchoring portions set in the centers at the time of their casting.

The above means has proved to be relatively practical and effective. However, the connection established thereby consists of a limited series of rather short, circumferentially extending thin welds, on a common radial plane of the wheel of extremely limited axial extent. The above, coupled with the inherent flexibility of the pads often results in an undesirable situation where flexure of the pads permits relative working or movement between the rim and the center and which results in work hardening of the pads (particularly at or adjacent to the welds) and premature failure of the desired connections.

Another means employed by the prior art to fix rims and wheel centers together includes the establishing of circumferentially spaced, radially outwardly opening depressions, sockets or blind openings in the outer perimeter of the centers and radially inwardly projecting dimples in the rims which project into and are seated in the sockets. In this form of connection, it is imperative that the rims seat uniformly and snugly about the centers and that the dimples be formed into snug, uniform and intimate contact in and with the sockets as any flexure of the rim which results in relative working between the rim and center causes a rapid breaking down of the relatively soft inflexible aluminum stock about the sockets and dimples with resulting failure of the connections established thereby. In efforts to satisfy the above noted requirements, efforts have been made to maintain careful quality control over the inside dimensions of the rims and outside dimensions of the centers whereby a uniform sliding fit is established therebetween and the depressions or sockets are tapered inwardly as they extend radially inwardly into the centers with the result that the dimples can be drawn deeper into the depressions with greater likelihood that: (1) they will retain their formed shape, and (2) they will remain in intimate contact in the sockets.

The above noted efforts to maintain the desired tolerances between the rims and centers has proven to be extremely difficult and a questionable production practice from a practical standpoint, as the present procedure, existing means and materials employed in the manufacture of the steel rims do not lend themselves to the maintaining of necessary tolerances, both as to circularity and inside dimensions of the rims. If a loose fit is established between the rims and centers about any appreciable extent of the joinder between them and such that the relative flexure of the rim is permitted, the structures will likely fail. If a very snug or tight fit is established, upon assembly, the leading edges of the centers tend to chip and/or break down, disfiguring and adversely affecting the aesthetics of the finished product.

Tapering of the sockets and establishing them of sufficient depth to enable the rim stock to be dimpled and drawn into the sockets so as to establish snug dimple and socket contact has proved to be of questionable effectiveness since such structure and procedure requires the rim stock to be drawn to, and oftentimes beyond, its elastic limits which frequently results in rupturing of the rim stock and a defective product which leaks air from within its related tire.

Still other means for securing wheel rims and centers together have included such means as bolt-like pins and fasteners advanced radially inwardly through openings in the rims and into the centers. Such means have proven to be of questionable effectiveness since the establishing of the necessary openings in the rims greatly increases the likelihood of leaks and requires the use of costly time consuming sealing means and procedures to guard against such leaks.

An object and feature of our invention is to provide a novel and improved means of joinder between a wheel rim and center of the character referred to above wherein the center is press fitted into tight uniform engagement in and with the rim about the circumferential extent of the line of joinder therebetween without chipping, or other aesthetic disfigurement of the related parts.

Another object and feature of the instant invention is to provide a wheel rim and center joinder means or connection of the character referred to above where the rim stock is dimpled into radially outwardly opening sockets in the wheel at circumferentially spaced points about the perimeter of the center.

It is a further object of the instant invention to provide means of the character referred to above wherein the outer periphery of the center is provided with axially spaced radially outwardly projecting deformable, rim engaging ribs defining axially spaced radially outwardly opening annular channels communicating with the sockets and on a body of relatively non-yielding hard cement in the grooves and sockets bonded with adjacent opposing surfaces of the rim and center and filling the voids and interstices between the rim and the center and about and between the dimple and socket of the rim and in the center whereby uniform uninterrupted non-yielding support between the rim and center and about and between the dimples and sockets is afforded by the cement.

Yet another object and feature of the present invention is to provide a structure of the character referred to above wherein the axial outermost annular ribs about the perimeter of the wheel center are spaced axially inwardly from the axial end edges of the outer cylindrical surface of the center, wherein the diameter of that surface is less and the diameter of the ribs is greater then the inside, center engaging, surface of the rim whereby the end edge portions of the center can be freely entered into the rim without chipping or mutilation therefor, and the ribs, upon being forced into engagement into the ribs are compressed and can be displaced radially and axially by the rim without interference with the aesthetics of the wheel structure.

It is an object and feature of our invention to provide a structure of the character referred to above wherein the cement, in a fluid, uncured condition is disposited in and about the grooves and in the sockets before the center is engaged in the rim whereby the cement serves as a lubricant between the rim and center and is displaced by the ribs and rim when the ribs are compressed and displaced. The cement is caused to flow and is urged in and about the grooves and the sockets to assure substantially complete or total occupation of the spaces defined by the rim and ribs occupied by the cement, when the parts are assembled.

It is yet another object and feature of the invention to provide a structure of the character referred to wherein the portions of the rim outward of and about the open ends of the sockets is supported and held spaced outward from the edges of the sockets whereby upon forming the dimples of the stock of said rim portions, in the sockets, the stock spaced outward of and about the sockets is free to bend and form the peripheral portions of the dimples and is not subject to being sheared at the edges of the sockets as would be the case if that stock was engaged on and supported at said socket edges.

Another object and feature of this invention is to provide a structure of the character referred to above wherein the cement effectively seals any ruptures or tears that might be established in the rim upon being dimpled whereby an air-tight rim structure is substantially assured despite dimpling of the rim stock.

The foregoing and other objects and features of our invention will become apparent and fully understood from the following detailed description of typical preferred forms and applications of the invention throughout which description reference is made to the accompanying drawings, in which:

FIG. 1 is a front axial plane view of a wheel embodying the present invention;

FIG. 2 is a sectional view taken substantially as indicated by line 2—2 on FIG. 1;

FIG. 3 is an enlarged sectional view taken as indicated by line 3—3 on FIG. 1;

FIG. 4 is an enlarged, exploded, sectional view of structure shown in FIG. 3;

FIG. 5 is a view of the structure shown in FIG. 4 with parts in another portion;

FIG. 6 is a view similar to FIG. 5 with the parts worked upon and formed;

FIG. 7 is a view taken substantially as indicated by line 7—7 on FIG. 3;

FIG. 8 is an elevational view of a portion of a modified form of the invention;

FIG. 9 is a sectional view of a portion of another form of the wheel center embodying the instant invention; and FIG. 10 is a sectional view of the structure shown in FIG. 9 related with a rim.

Referring to the drawings, the wheel W that we provide includes generally, an outer rim R and an inner center C. The rim is an annular, formed steel, ring-like part and is characterized by a straight, cylindrical central portion 10 defining a cylindrical radially inwardly disposed inside surface 11 and by inner and outer end portions 12, formed to extend axially and radially outwardly from the opposite ends of the central portion 10 to define axially spaced tire cord engaging means 13. The extent and configuration of the portions 12 and means 13 can vary widely in practice and in no way alters or affects the novelty and spirit of the instant invention.

The rim R is established of tough, durable resilient steel stock and is established by suitable roll and/or draw forming and by welding operations. While tolerances of the size and dimension of such wheels are maintained as tight and as close as is practical, such tolerances, as compared with tolerances readily and practically maintained in machined casting, are rather loose, great or extensive. As a result, the diameter of the inside surfaces 11 of the rims, which surfaces are the surfaces of the rims with which the wheel centers are directly related, are subject to considerable variation.

Not only are the portions 10 and surfaces 11 of the rims R subject to variations in diametric extent, they are also subject to being out of round and such that that when centers are related thereto, the centers must be effective to force and yieldingly bias the rims to a true and round condition.

At this point, it is important to note that the wheel centers, in order to effectively move the urge out of round rims to a round state or condition, cannot be less in outside diameter than the diametric extent of the rim surfaces 11 but must be the same as or greater in diameter than the surfaces and such that when they are slid and/or urged and pressed into the rims, they will be effective to bias the rims, as required.

The wheel center C is cast metal. As a general rule, it is cast of a non-ferrous, light weight alloy, such as an aluminum alloy. The center is therefore rather soft and non-flexible as compared with the formed ferrous metal rim R and is such that any relative working that might occur between the rim and the center will result in rapid wearing and breaking down of the aluminum stock of the center and thereby increases the extent of relative working of the parts and accelerate the wearing and deterioration of the center.

The center C is a unitary cast metal part characterized by an outer annular ring portion O with a straight radially outwardly disposed outer cylindrical surface 20, a central hub portion H spaced radially inwardly from the ring portion O and an intermediate, disc portion D. The hub portion H defines a central bearing accommodating opening 21 and can be of any desired axial extent. The hub portion H is also characterized by a radially extending flange-like pad 22 in which stud receiving openings 23 are provided. The disc portion D can vary widely in form and design and includes any structure that might be provided between the hub and ring portions H and O. In the case illustrated, the disc portion is characterized by what appears to be five, circumferentially spaced, radially extending, radially outwardly divergent spokes 24 and intermediate ports or windows 25.

In practice, for example, the disc portion D could comprise a simple extension or continuation of the pad 22 of the hub portion which extension could include apertures and/or windows to embellish it with desired aesthetic characteristics.

In the instant invention, the ring portion O of the wheel center C is that portion which establishes a direct relationship with the rim R and is the only truly pertinent and controlling portion of the center. All parts and portions of the center C, other than the ring portion O, can be altered and varied as desired without departing from the spirit of our invention.

The ring portion O and the outer surface 20 of the center C are preferably equal to or less in axial extent than the central portion 10 and/or surface 11 of the rim R and are slightly less in diametric extent than the smallest anticipated diameter of the inside surface 11 of the rim R to be related to it.

The surface 20 of the ring portion O is provided with a plurality of axially spaced radially outwardly projecting ribs 30, the outside diameter of which is slightly greater than the greatest or largest anticipated diameter of the inside surface of the rim R to be related to it.

In considering the foregoing, "anticipated diameter" makes reference to or is intended to take into consideration the range of tolerances found to exist in the diameters of the inside surfaces 11 of the rims R.

With the above relationship of parts, it will be apparent that the outside surface 20 of the center C will freely enter and establish spaced opposed relationship with the inside surface 71 of the rim R and the ribs 30 will establish interference fit in the central portion 10 and the inside surface 11 of the rim, regardless of the diametric extent of the surface 11, within anticipated tolerances.

The above makes reference to extreme conditions that might prevail. In practice, a mean interference fit is most commonly established between the ribs 30 and the surface 11, which interference is preferably about 0.020 inch. The outisde surface 20 and ribs 30 are established on and about the ring portion of the center C by a suitable machining operation.

The ribs 30 can vary in number and in axial extent and are preferably provided with inclined, radially outwardly convergent opposite edges or sides 31, and straight outside or top surfaces 32.

The axial extent of the ribs 30 is dictated in part by the ductility and/or softness of the aluminum alloy and with the view that the ribs be provided with sufficient stock to support the radial loads to be applied thereto and yet not so much stock and self-backing as would prevent desired and necessary displacement of the rib stock when the parts are assembled, as will hereinafter be described.

The axially disposed surfaces or ends 36 of the center C (including the ring portion thereof), particularly the front end thereof, are decorative surfaces and are machined, polished and/or plated bright. Accordingly, care must be exercised not to scuff, chip or otherwise disfigure or mutilate the outer edges 35 of the rim portions. To this end, the edges 35 are provided with a small, tight radius between the end surfaces 36 and the outside surface 20 of the ring portion O of the center C and the axial, outermost ribs 30 are spaced a short distance axially inward of the related end surfaces 36.

With the above relationship of parts, it will be apparent that when the ring portion O of the center C is entered into engagement in the central portion 10 of the rim and with the inside surface 11, the end portion of the ring portion O freely enters the said ring portion 10, acts or serves as a pilot for the first to enter rib 30 and is not subject to being scarred or mutilated.

As the center C is advanced into engagement in the rim R, as above noted, the outermost inclined side 31 of the first rib 30, by virtue of the inclined plane effect established by that edge and any opposing surface of the rim structure, operates or functions to guide and center the center in the rim and to initiate the establishment of the desired interference fit by wedging the rib into engagement in the rim.

As advancement and engagement of the center C into the rim R is continued, each rib initiates establishment of its interference fit in the rim, in the same manner.

It is to be noted that with the interference fit thus established, the roundness of the rim R is trued a portion of the stock of the ribs 30 is displaced and uninterrupted, intimate supporting contact is established between the rim and center. The surfaces 11 and 20 and the opposing sides of adjacent ribs define closed, sealed, axially spaced, annular ducts 40 between the rim and the center.

In the form of the invention shown in FIGS. 2 through 8, the center C is provided with four (4) axially spaced ribs 30, the axial extent of which is substantially equal to the axial spaces between adjacent ribs.

In practice, for example, and as shown in FIGS. 9 and 10 of the drawings, two (2) ribs 30'' can be provided on the surface 20'' of the ring portion O'' of the wheel center C''.

Further, in practice and as shown in FIG. 8 of the drawings, the outer periphery of the ring portion O' can be provided with notches or recesses 45, to conserve of metal and reduce the weight of the center C'. In such a case, the notches 45', if arranged to open at the surface 20', as shown, must be of limited axial extent and extend through and interrupt a limited number of ribs 30' so that the sought after and necessary uniform, uninterrupted support between the rim and center can be and is attained by other, uneffected ribs. Further, in such a case, the circumferential extent and spacing of the notches must be such that no excessive unsupported extent of the rim is presented thereby and which might result in adverse flexing of the rim relative to the center when the wheel is in use.

The provision of notches such as referred to above are an added feature which does not alter or change the broader aspects of our invention.

In addition to the foregoing, the present invention further includes the provision of a plurality of circumferentially spaced radially outwardly opening recesses 50 in the ring portion O of the center R, entering the outside surface 20 at points between the outermost ribs 30 and radially inwardly extending projections 51 formed in the central portion 10 of the rim and projecting into the recesses 50 to lock and fix the rim R and center C against relative axial and circumferential movement and/or displacement.

In practice, the recesses 50 can be in the form of simple, straight blind opening sockets formed in the ring portion O by a suitable drilling operation and can be arranged about the ring portion O as desired or as circumstances require. For example, and as shown and indicated in the drawings, the recesses 50 are drilled sockets arranged in circumferenitally spaced sets of three (3), there being one set at the outer end of each spoke-like portion of the disc portion D of the wheel center.

The recesses 50 are shown positioned between the two inside ribs and are shown as being of such diametric extent that they enter the opposing side portions of their related ribs.

As shown in FIGS. 9 and 10 of the drawings, where but two ribs 30″ are provided, the centrally arranged recesses 50″ are spaced from and clear of the ribs.

The projections 51 are established in the central portion 10 of the rim R by a suitable dimpling tool, indicated at 52 in FIGS. 5 and 6 of the drawings and are, as indicated, in the nature of simple dimples.

The dimples or projections 51 are formed to the maximum extent afforded by the modulus of elasticity of the metal stock of the rim and to the end that they are formed into intimate contact in and with the recesses 50, without rupturing the stock of the rim and to such an extent that they are least likely to withdraw from such contact upon removal or withdrawal of the dimpling tool 53 therefrom.

The above has presented a major problem in the prior art where efforts have been made to secure rim and center by other dimpling means, since if the rim stock is drawn and moved to such an extent that it will not spring back, it is subject to and frequently ruptures with the result that the wheel leaks air. On the other hand, if the stock is found and urged into contact in a recess, but not drawn so much as to likely rupture, upon removal of the forming tool, the stock moved back and out of intimate contact in the recess and a desired and required connection is not attained.

In furtherance of the present invention, while effort is not made to over work and rupture the rim stock, effort is made to form the stock to that extent that lasting intimate contact between the dimples or projection 51 and their related sockets or recess 50 is substantially assured. An incidental ruptured dimple or two is taken into account and is insignificant.

On the other hand, an incidental loss of intimate contact between a dimple or two and their related recesses is also taken into account and is insignificant.

In furtherance of our invention and to take into account and allow for or permit loss of intimate contact between dimple projections and socket-like depressions and/or the rupturing of the dimple projections, we provide a dense impervious cement filler F in the sockets or depressions and into which the dimples or projections are formed. The cement is suitable, hard, strong epoxy which, upon curing, is nearly as strong, as stong or stronger than the aluminum alloy of which the center C is established.

In practice, a small quantity of the plastic or fluid uncured cement is deposited in each depression or socket. Upon forming the dimples in the sockets the cement deposited therein is displaced thereby to substantially fully occupy the space between the dimple and socket.

It will be apparent that when the cement cures, any rupture in the dimples is effectively and positively sealed and any space between the sockets and dimples is occupied or filled with the cement, with the result that the resulting wheel cannot leak air and the rim and center are immovably locked together.

In addition to depositing the cement filler F in the depressions or socket 50, the annular, radially outwardly opening spaces or channels defined by the ribs 30 and outside surface 20 are filled with the cement prior to engaging the center in the rim and so that when the parts are assembled the annular ducts 40 established by the assembly are cement filled and a substantially total, uninterrupted bearing support is provided between the rim and center.

The support between the rim and center afforded by the cement filler F is highly desirable and is important since the straight central portions 10 of the rims are not always straight. Frequently, the rim portions 10 are slightly bellied or bowed, axially or may even be somewhat accordioned axially, with the result that voids and/or spaces between the rim and center are apt to occur, in spite of the press and interference fit established therebetween.

The extent and location of such voids and/or spaces and the adverse effect they might ordinarily create in the end product is not readily determinable. However, with the filler F, here provided, the existence of such void and/or spaces is of no concern and no ill or adverse effects can result therefrom.

In practice, the cement filler F, in a plastic, uncured state, is brushed or is wiped about the outer periphery of the center with a spackle knife prior to engaging the center in the rim. It need not be deposited in the sockets or depressions with any particularity as more than sufficient cement can be accumulated by and retained in the grooves between the ribs. Upon urging the center in the rim and displacing the outer portions of the ribs, the uncured cement is also displaced and caused to flow about the ducts and find its way into all voids and interstices in and between the center and rim, including the depressions or sockets, in the center (adding to whatever cement was deposited therein when applying the cement). Accordingly, filling of spaces and interstices between the rim and center with cement and attaining of the sought after support afforded thereby is substantially assured.

While the support afforded by the cement filler F is of prime concern and importance, it is to be noted that the bond with and between the rim and center afforded by the cement is desirable and provides an added desirable feature.

It is also to be noted that while the ribs 30 are intended to afford the above noted interference fit with the rim, they also serve to hold and retain the cement upon assembling of the construction and serve to define the ducts for the cement filler in the completed structure, which second and third functions are as significant as the first.

It is to be noted that if a center, without ribs, was painted or coated with a cement before being press fitted in a rim (as has been attempted by the prior art), upon advancing the center into the rim, the cement would be wiped off of and displaced from the center by the rim and insufficient cement would be left to fill any voids and interstices occurring between the rim and center and desired support could not be afforded. This was found to be true when attempts were made to so employ an epoxy cement in assembling wheels in accordance with the teachings of the prior art.

It is to be noted and understood that while the cement filler F is a most desirable and advantageous feature of our invention, the wheel structure, here provided, without the filler is a meritorious advance over the teaching of the prior art and affords a wheel structure which is more stable and trouble-free than wheel structures provided by the prior art wherein the rims and centers are secured together by dimpling means.

From the foregoing, it will be apparent that we have invented a new and improved wheel structure wherein substantially complete, uninterrupted bearing support is provided between the rim and center, wherein the dimples are set in their related sockets against any movement relative thereto and wherein no likelihood of air leaks exists as a result of possible rupture of the rim stock at or about the dimples formed therein.

Having described only typically preferred forms and applications of our invention, we do not wish to be limited to the specific details herein set forth, but wish to reserve to ourselves any modifications and/or variations that may appear to those skilled in the art and which fall within the scope of the following claims:

Having described our invention, we claim:

1. A wheel structure comprising an outer annular tire-engaging steel rim with an axially extending inner annular wall defining a radially inwardly disposed annular inner surface, a non-ferrous metal center more ductile than said rim arranged centrally within the rim and having a central hub portion, an outer ring portion and means between and joining the hub and ring portions, said ring portion having a straight axially extending radially outwardly disposed outer surface, opposing said inner surface, a plurality of axially spaced radially outwardly projecting ribs on said outer surface and in tight interfering engagement with the inner surface, a plurality of circumferentially spaced radially outwardly opening blind recesses in said ring portion between axially spaced ribs and opposing said wall and radially inwardly projecting dimples formed in said wall and extending into said recesses.

2. A wheel structure as set forth in claim 1 which further includes a cement filler deposited in the recesses and into which the dimples are formed whereby non-yielding immovable support is provided by the cement between the recesses and the dimples.

3. A wheel structure as set forth in claim 1 which further includes a cement filler in annular channels defined by said inner and outer surfaces and said ribs and providing substantially uninterrupted and uniform, non-yielding support between the rim and the center.

4. A wheel structure as set forth in claim 1 which further includes a cement filler in annular channels defined by said inner and outer surface and said ribs and in said recesses providing substantially uninterrupted and uniform non-yielding support between the rim and the center and into which the dimples are formed whereby non-yieldingly immovable support is provided by the cement between the recesses and the dimples.

5. A wheel structure as set forth in claim 1, wherein the outside surface is less in diametric extent than the inside surface and the outside diameter of the ribs is normally greater than said inside surfaces whereby the ring portion freely enters the rim and only the ribs engage the inner surface of the rim and establish an interfering fit therewith, whereby the portions of the ribs interfering with the rim are displaced thereby and said ribs establish substantially uniform uninterrupted engagement with said inner surface.

6. A wheel structure as set forth in claim 5 which further includes a cement filler deposited in the recesses and into which the dimples are formed whereby non-yielding immovable support is provided by the cement between the recesses and the dimples.

7. A wheel structure as set forth in claim 5 wherein the ribs related to the ends of the outer surface are spaced axially inward from the ends of said outer surface whereby the end portions of the ring portion axially outward of said ribs establish pilot means to orient and direct the ribs into engagement in and with the inner surface of the rim.

8. A wheel structure as set forth in claim 1 which further includes a cement filler in annular channels defined by said inner and outer surface and said ribs and in said recesses providing substantially uninterrupted and uniform non-yielding support between the rim and the center and into which the dimples are formed whereby non-yieldingly immovable support is provided by the cement between the recesses and the dimples.

9. A wheel structure as set forth in claim 1 which further includes a cement filler in annular channels defined by said inner and outer surfaces and said ribs and providing substantially uninterrupted and uniform, non-yielding support between the rim and the center.

10. A wheel structure as set forth in claim 1 wherein the recesses are arranged axially inward of and between axially spaced ribs and wherein the ribs and said inner and outer surfaces define annular ducts communicating with the recess and a filler of supporting cement in said ducts and in the recess and filling voids and interstices between the rim and the center.

* * * * *